March 19, 1940.  G. WÜNSCH  2,194,374

SERVOMOTOR MOUNTING

Filed Feb. 9, 1938

Inventor:
Guido Wünsch

Patented Mar. 19, 1940

2,194,374

UNITED STATES PATENT OFFICE 2,194,374

SERVOMOTOR MOUNTING

Guido Wünsch, Berlin-Steglitz, Germany, assignor to Askania-Werke A. G., a corporation of Germany Application February 9, 1938, Serial No. 189,665
In Germany February 8, 1937

8 Claims. (Cl. 121—194)

This invention relates to improvements relating to servomotors, more particularly to servomotors for operating a crank.

It is an object of this invention to provide an improved arrangement of a servomotor and a crank operated thereby, wherein forces exerted by the servomotor will cause no reaction on the structure on which the servomotor is mounted.

The present invention is especially useful in installations where a servomotor is to be mounted on light structure and structure of little rigidity. In aircraft, for example, it has been customary to provide for servomotors for operating control surfaces rigid and heavy supports to be mounted on the fuselage, as the fuselage on account of its light construction is not able to withstand the forces exerted by the servomotor without substantial deformation.

The present invention aims at providing an improved servomotor arrangement which may be mounted on very light and even resilient structure without the aid of a reinforcing base or support.

Aims, objects, and advantages of this invention will appear from a consideration of the description which follows with the accompanying drawing showing for purely illustrative purposes embodiments of this invention. It is to be understood, however, that the description is not to be taken in a limiting sense, the scope of this invention being defined in the appended claims.

Referring to the drawing.

Figure 1:
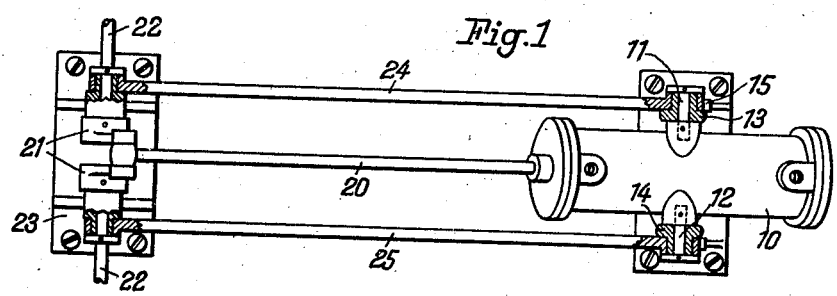
Fig. 1 is a plan view of a cylinder and piston servomotor embodying the present invention.
Figure 2:
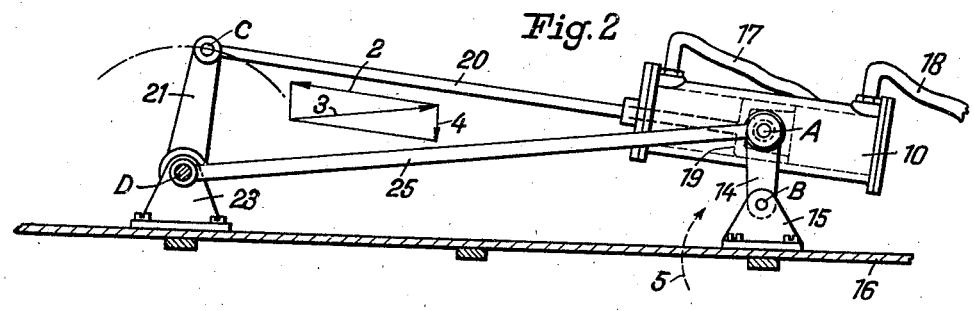
Fig. 2 is an elevation of the device shown in Fig. 1.

A servomotor cylinder 10 having trunnions 11 and 12 is mounted for oscillation in intermediate members 13 and 14 for movement about an axis A. The intermediate members 13 and 14 are pivotally mounted in a support 15 about an axis B, the support being shown as secured to a light structure 16.

Pressure fluid for operating the servomotor is conducted to the cylinder through flexible conduits 17 and 18 to act on one or the other side of a piston 19 movable in the cylinder 10. A piston rod 20 connects the piston with a crank 21, a pivotal connection being shown at C. The crank is rigidly secured to a shaft 22, crank and shaft being supported for rotation about an axis D by a bearing 23 attached to the fundamental structure apart from the support 15 for the servomotor.

In order to prevent reaction forces from being exerted on the supporting structure rods 24 and 25 are provided for bracing the cylinder 10 against the shaft 22.

The operation of the device is as follows:

When pressure fluid is supplied through the conduit 18, the piston 19 moves to the left exerting a force indicated by an arrow 2 for counterclockwisely rotating the crank about the axis D. A reaction force will be exerted on the cylinder by the rods 24 and 25 and indicated by an arrow 3, appearing as a diagonal in a parallelogram of forces completed by a vertical force 4 in the direction of the axes A, B and apparently increasing slightly the weight of the servomotor.

Assuming for purposes of comparison that the servomotor cylinder 10 were rigidly mounted on the support 15 and the braces 24 and 25 omitted, as is the case in conventional servomotor arrangements, it appears that upon an actuation of the servomotor by supplying pressure fluid through the conduit 18 a force would be exerted on the support 15 in the direction of the dotted arrow 5, tending to tear the support off the structure 16 and deforming the same. It is also apparent that the improved servomotor arrangement will permit of substantial variations in the distance of the axes D and B caused, for example, by deformations of the structure 16 without causing excessive forces to be exerted by the servomotor on the structure 16.

Figure 3:
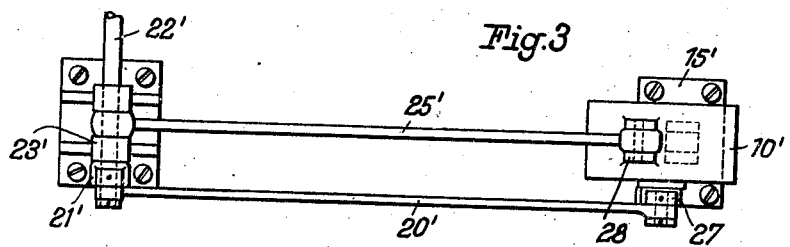
Fig. 3 is a plan view of a rotary servomotor embodying the present invention.
Figure 4:
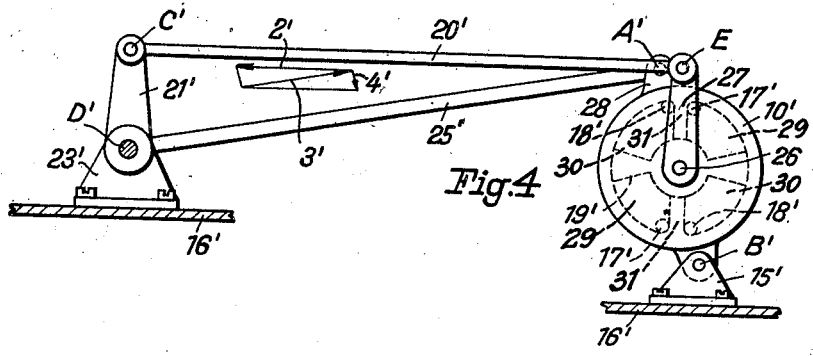
Fig. 4 is an elevation of the device shown in Fig. 3.

A modified form of the invention shown as applied to rotary servomotors is shown in Figs. 3 and 4. In a casing 10' supplied with pressure fluid at 17' and 18' a rotary vane 19' is movable which forms expansible chambers 29, 30 with fixed abutments 31. The housing of the servomotor is pivotally mounted about an axis B' in a support 15', the support being secured to a light structure 16'. To a shaft 26 of the servomotor rotated by the rotary vane 19' a crank 27 is secured operating a second crank 21' through a rod 20', the rod being pivotally connected to the cranks at C' and E, respectively. The crank 21' rigidly secured to a shaft 22' is rotatably mounted about an axis D' in a bearing 23', the bearing being secured to the structure 16'. The servomotor casing 10' is provided with a lug 28 to which a brace 25' is pivotally connected about an axis A', the other end of the brace being connected to the bearing 23' at the axis D'.

The operation of the device is as follows:

When the pressure fluid is supplied to the servomotor at 18', the rotary vane 19' will move in counter-clockwise direction exerting on the rod 20' a force indicated by an arrow 2'. A reaction force will be exerted by the brace in the direction of the arrow 3' which again is the diagonal in a parallelogram completed by a force 4' acting on the support 15' in the direction A', B' and apparently slightly increasing the weight of the servomotor. When the distances of the axes A' and E to the shaft 26 are made equal, that is by making the distance A'—26 equal to the radius of the crank 27, no forces will be exerted on the support 15' in a direction other than A', B', whereby a deformation of the structure 16' is effectively obviated.

Obviously, the present invention is not restricted to the particular embodiments herein shown and described.

What is claimed is:

1. The combination of a servomotor including a cylinder and a piston; a fundamental structure; a support attached to a relatively weak part of said structure; means for pivoting the cylinder on said support about a first axis; a crank and shaft rigidly connected with each other; a bearing mounted on said structure apart from said support for holding said crank and shaft turnable about a second axis parallel to said first axis; a first rod connecting said piston and said crank; and a second rod connecting said cylinder and said bearing.

2. The combination with a servomotor including a cylinder and a piston; a fundamental structure; a support attached to a relatively weak part of said structure; an intermediate member pivotally connected to said cylinder and support, thereby supporting said cylinder; a crank and shaft rigidly connected with each other; a bearing for said crank and shaft mounted on said structure apart from said support; a first rod connecting said piston and said crank; and a second rod bracing said cylinder against said bearing.

3. The combination of a cylinder having a transverse trunnion; a piston movable in said cylinder; a fundamental structure; a support attached to a relatively weak part of said structure; an intermediate member pivotally connected to said support and receiving said trunnion; a crank and shaft rigidly connected with each other; a bearing for said crank and shaft mounted on said structure apart from said support; a first rod connecting said piston and said crank; and a second rod pivotally connected to said bearing and receiving said trunnion.

4. The combination with a rotary servomotor including a casing and a shaft rotatable relatively thereto; of a first crank secured to the motor shaft; a fundamental structure; a support attached to a relatively weak part of said structure; means for pivoting said casing on said support about a first axis parallel to the motor shaft; a bearing mounted on said structure apart from said support; a second crank mounted in said bearing for turning about a second axis parallel to the motor shaft; a first rod connecting said first and second crank; and a second rod pivotally connected with one end to said bearing and with the other end to a point of said casing spaced from the motor shaft by a distance approximately equal to the radius of the first crank, whereby the support carrying said casing remains unaffected from the forces exerted by the motor.

5. The combination with a rotary servomotor including a casing and a shaft rotatable relatively thereto; of a first crank secured to the motor shaft; a fundamental structure; a support attached to a relatively weak part of said structure; means for pivoting said casing on said support about an axis parallel to the motor axis; a second crank and shaft rigidly connected with each other; a bearing mounted on said structure apart from said support for holding said crank and shaft turnable about a second axis parallel to the motor axis; a first rod connecting said first and second crank; and a second rod pivotally connected with one end to said bearing and with the other end to a point of said casing spaced from the motor shaft by a distance approximately equal to the radius of the first crank, whereby the support carrying said casing remains unaffected from the forces exerted by the motor.

6. The combination with a rotary servomotor including a casing and a shaft rotatable relatively thereto; of a first crank secured to the motor shaft; a fundamental structure; a support attached to a relatively weak part of said structure; means for pivoting said casing on said support about an axis parallel to the motor axis; a second crank and shaft rigidly connected with each other; a bearing mounted on said structure apart from said support for holding said crank and shaft turnable about a second axis parallel to the motor axis; a first rod connecting said first and second crank; and a second rod pivotally connected with one end to said bearing and with the other end to a point of said casing spaced from the motor shaft by a distance approximately equal to the radius of the first crank, whereby the support carrying said casing remains unaffected from the forces exerted by the motor.

7. The combination with a servomotor comprising a housing and a member movable thereto; a fundamental structure; a first support attached to a relatively weak part of said structure; means for pivoting said housing on said first support about a first axis; a second support attached to said structure apart from said first support; a crank mounted on said second support for turning about a second axis parallel to said first axis; a first rod connecting the movable member of the servomotor with said crank; and a second rod of which the one end is journalled at said housing, the other end is journalled at said second support.

8. The combination of a rudder motor for aircraft comprising, a housing and a member movable thereto; a support attached to the fuselage of the craft; means for pivoting said housing on said support about a first axis; a crank and shaft rigidly connected with each other; a bearing supporting said crank and shaft about a second axis parallel to said first axis; said bearing being mounted on the fuselage apart from said support; a first rod connecting the movable member of the servomotor with said crank; and a second rod bracing said housing against said bearing.

GUIDO WÜNSCH.